April 5, 1927.

W. G. BOWERS ET AL 1,623,382

BRAKE LOCK

Filed Oct. 30, 1926   2 Sheets-Sheet 1

Walter G. Bowers
Charles A. Smith,
INVENTORS

BY Victor J. Evans
ATTORNEY

WITNESS:

April 5, 1927.
W. G. BOWERS ET AL
1,623,382
BRAKE LOCK
Filed Oct. 30, 1926    2 Sheets-Sheet 2
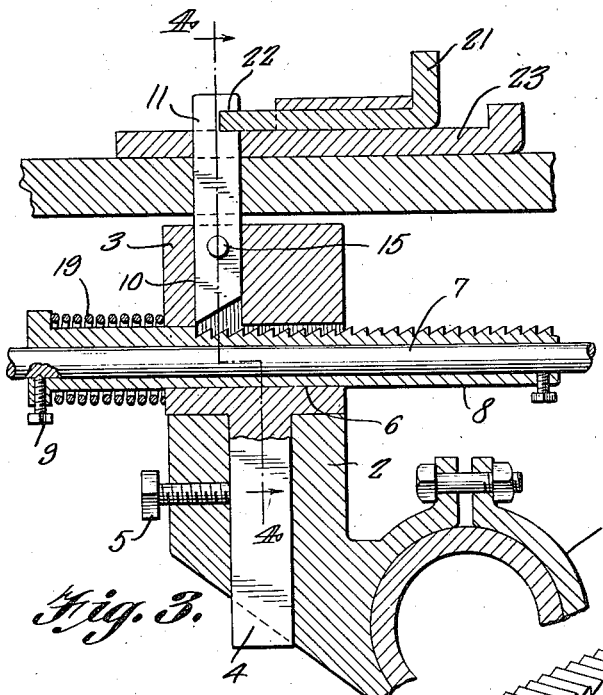
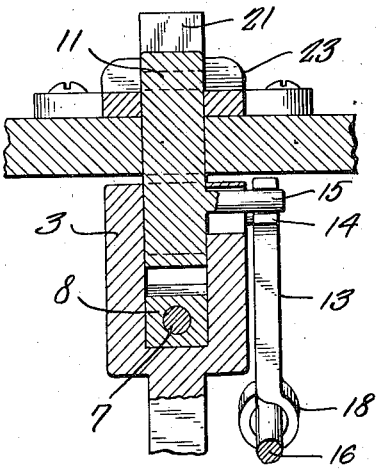
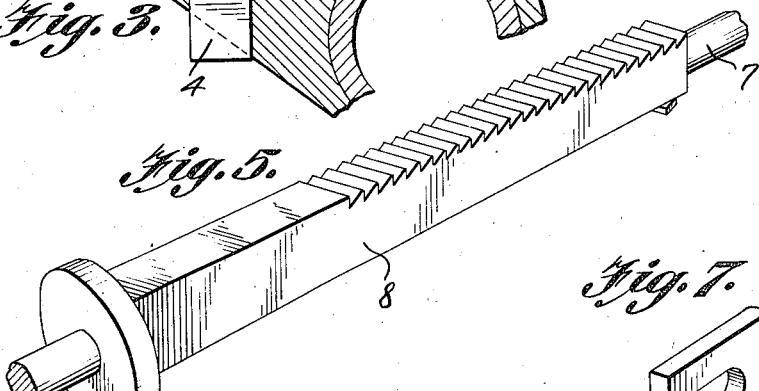
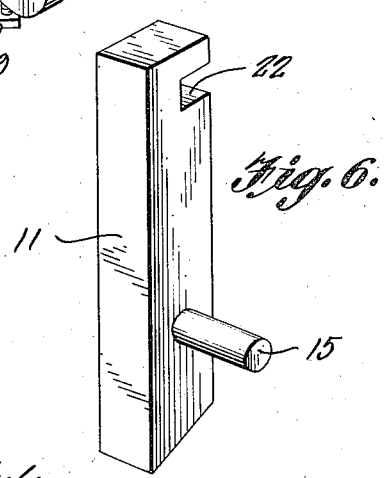
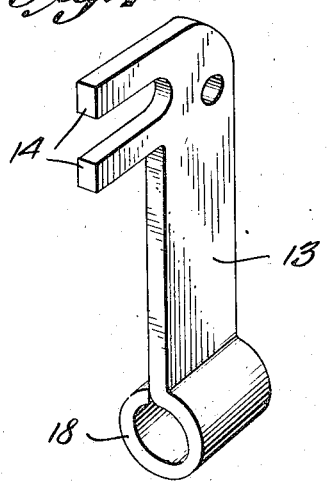
Walter G. Bowers
Charles A. Smith,
INVENTORS
BY Victor J. Evans
ATTORNEY
WITNESS:

Patented Apr. 5, 1927.

1,623,382

UNITED STATES PATENT OFFICE.

WALTER G. BOWERS AND CHARLES A. SMITH, OF AKRON, OHIO.

BRAKE LOCK.

Application filed October 30, 1926. Serial No. 145,319.

This invention relates to an attachment for a motor vehicle, the general object of the invention being to provide means for automatically holding the foot brake applied so that the foot can be removed from the brake pedal without releasing the brakes, with means operated by the clutch pedal for releasing the brakes as the clutch pedal returns to normal position, thus preventing stalling of the engine of the vehicle and also preventing the vehicle from rolling down a grade as the gears are being shifted.

Another object of the invention is to provide means for rendering the device inoperative whenever desired.

A still further object of the invention is to so arrange the parts that the manipulation of the pedals will operate the parts without any further action on the part of the driver.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 3 is a vertical sectional view through parts of the device.

Figure 4 is a section on line 4—4 of Figure 3.

Figure 5 is a perspective view of the rack bar.

Figure 6 is a perspective view of the dog for engaging the rack bar.

Figure 7 is a view of the lever for raising the dog by the clutch pedal.

Figure 1:
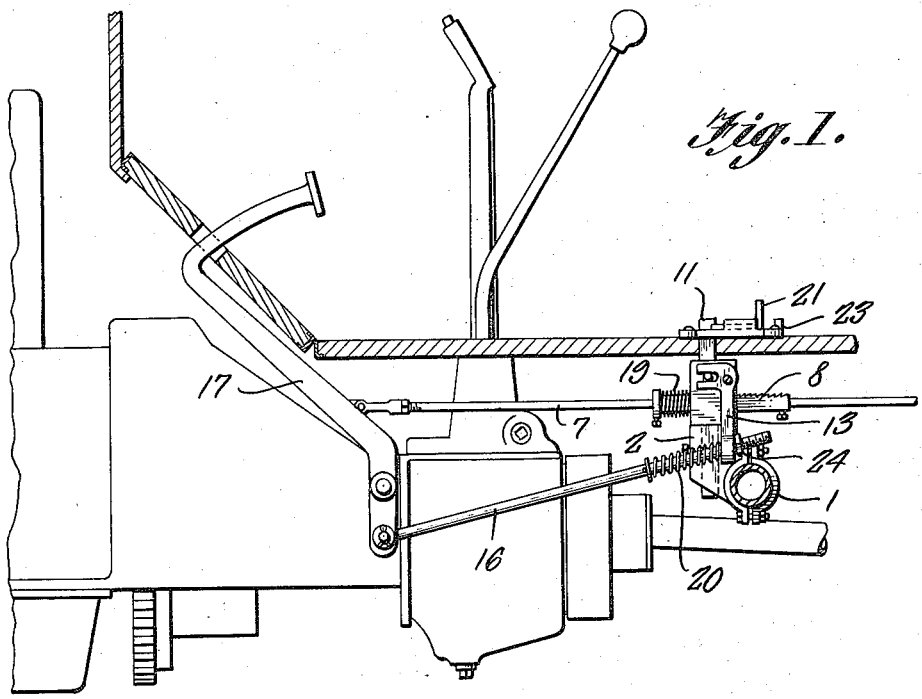
Figure 1 is a sectional view through portion of a motor vehicle showing the invention in use.
Figure 2:
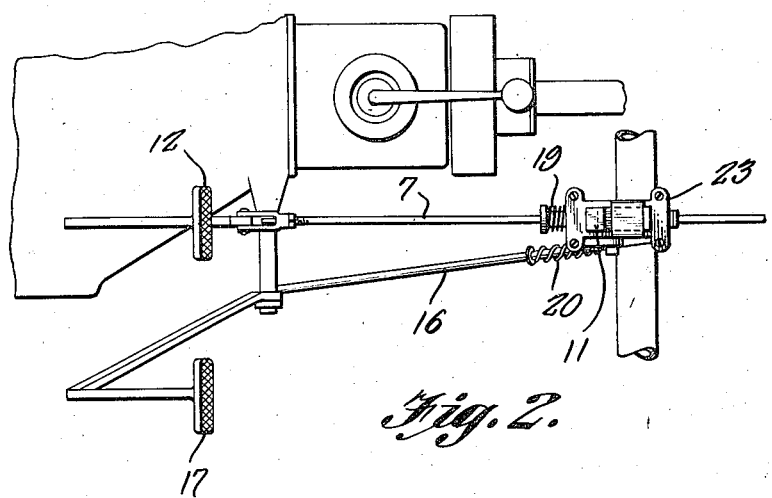
Figure 2 is a plan view of parts of Figure 1.

In these views, 1 indicates a clamp which is adapted to be clamped to one of the cross pieces of the chassis frame and 2 indicates a socket member carried by one part of the clamp. A body 3 is provided with a reduced lower part 4 which is held in the socket 2 by the bolt 5. The body 3 is provided with a transverse passage 6 therein through which the brake rod 7 passes and a rack bar 8 is fastened to the brake rod by the set screw 9 and this rack bar also passes through the passage 6. The body 3 is also provided with a vertical passage 10 in which is slidably mounted a dog 11, the beveled lower end of which is adapted to engage the teeth of the rack bar in such a manner that when the brake pedal 12 is depressed to apply the brakes, the dog, engaging the rack bar, will hold the brake rod in its forward position with the brakes applied.

A lever 13 is pivoted to the body 3 and has its forked upper end 14 engaging a pin 15 on the dog. A rod 16 is fastened to the clutch pedal 17 and passes through an arm 18 in the lever 13 so that as the clutch pedal moves forwardly to its normal position, the rod will pull upon the lever, thus rocking the same and causing its forked upper end to raise the dog so as to release the rack bar, thus permitting the brake means to move to inoperative position.

From the foregoing, it will be seen that as soon as the brake pedal is depressed, the dog, engaging the teeth of the rack bar, will hold the parts with the brakes applied so that the operator may remove his foot from the brake pedal without releasing the brakes. This will permit the operator to accelerate the engine and then, as soon as he removes his foot from the clutch pedal, the said pedal will return to normal position and through means of the rod 16 and the lever 13 will raise the dog and thus release the brakes. This attachment will prevent stalling of the engine and backward movement of the car on a grade while the gears are being shifted.

A spring 19 on the rack bar and a spring 20 on the rod 16 act to absorb shocks and eliminate noise incident to the abrupt release of the brakes.

In order to render the attachment inoperative whenever desired, we provide a latch plate 21 for engaging a notch 22 in the top of the dog so as to hold the dog in raised position out of engagement with the rack bar. This latch plate is carried by a floor plate 23 which is attached to a part of the floor of the vehicle adjacent the driver's seat so that the latch plate can be moved by the operator's foot.

A nut 24 is placed on the end of the rod 16 so that the time of movement of the lever 13 by the clutch can be adjusted as this nut engages the lever and transmits the movement of the rod 16 to the said lever. The spring 20 will permit movement of the clutch and the rod 16 without moving the lever 13.

As will be seen, the attachment works entirely by the movement of the pedals so that the operation of the device is entirely independent of any action of the part of the operator, other than the usual manipulation of the pedals.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. In combination with a motor vehicle and its brake and clutch means, a rack connected with one of the brake rods, a dog for holding the rack with the rod in its forward position when the brake pedal has been depressed and means, operated by the movement of the clutch pedal to normal position to release the dog from the rack.

2. In combination with a motor vehicle and its brake and clutch means, a rack connected with one of the brake rods, a dog for holding the rack with the rod in its forward position when the brake pedal has been depressed and means, operated by the movement of the clutch pedal to normal position, to release the dog from the rack and manually operated means for normally holding the dog out of engagement with the rack.

3. In combination with a motor vehicle and its clutch and brake means, a rack bar fastened to the brake rod which is connected with the brake pedal, a supporting member attached to a part of the vehicle and through which the rack bar passes, a dog sliding in the supporting member and engaging the rack, said dog acting to hold the rack with the brake rod in its forward position, a lever pivoted to the supporting member and engaging a part on the dog and means for attaching the lever to the clutch pedal so that the lever will be actuated to raise the dog off the rack upon the forward movement of the clutch pedal.

4. In combination with a motor vehicle and its clutch and brake means, a rack bar fastened to the brake rod which is connected with the brake pedal, a supporting member attached to a part of the vehicle and through which the rack bar passes, a dog sliding in the supporting member and engaging the rack, said dog acting to hold the rack with the brake rod in its forward position, a lever pivoted to the supporting member and engaging a part on the dog, means for attaching the lever to the clutch pedal so that the lever will be actuated to raise the dog off the rack upon the forward movement of the clutch pedal, such means comprising a rod pivoted to the clutch pedal and passing through an eye in the lever, a nut threaded to the rear end of the rod for engaging the lever and a spring on the rod located between a projection on the rod and the lever.

5. In combination with a motor vehicle and its clutch and brake means, a rack bar fastened to the brake rod which is connected with the brake pedal, a supporting member attached to a part of the vehicle and through which the rack bar passes, a dog sliding in the supporting member and engaging the rack, said dog acting to hold the rack with the brake rod in its forward position, a lever pivoted to the supporting member and engaging a part on the dog, means for attaching the lever to the clutch pedal so that the lever will be actuated to raise the dog off the rack upon the forward movement of the clutch pedal, such means comprising a rod pivoted to the clutch pedal and passing through an eye in the lever, a nut threaded to the rear end of the rod for engaging the lever, a spring on the rod located between a projection on the rod and the lever and a shock absorbing spring on the rack bar.

In testimony whereof we affix our signatures.

WALTER G. BOWERS.
CHARLES A. SMITH.